Aug. 22, 1944.  G. F. GARDNER  2,356,579

ZERO RETURN FOR GALVANOMETERS

Filed Aug. 27, 1943

Inventor:
George F. Gardner,
by Harry E. Dunham
His Attorney.

Patented Aug. 22, 1944

2,356,579

UNITED STATES PATENT OFFICE 2,356,579

ZERO RETURN FOR GALVANOMETERS

George F. Gardner, Alplaus, N. Y., assignor to General Electric Company, a corporation of New York Application August 27, 1943, Serial No. 500,234

4 Claims. (Cl. 171—95)

My invention relates to galvanometers, and in particular, to means for returning the movable element of the galvanometer to a zero position following a measurement deflection.

Suspension type galvanometers are known in which the suspended element has the torque of the suspension nullified in all positions so as to have negligible drift. Such a galvanometer is described in detail in application Serial No. 372,778, filed January 2, 1941, Theodore A. Rich, Galvanometer, now Patent No. 2,326,252, granted August 10, 1943, and assigned to the same assignee as the present invention. In this type of galvanometer it is desirable to return quickly the movable element of the galvanometer to a zero or central position following a measurement deflection in either direction from zero, and the present invention relates to a means for accomplishing this result.

Figure 2:
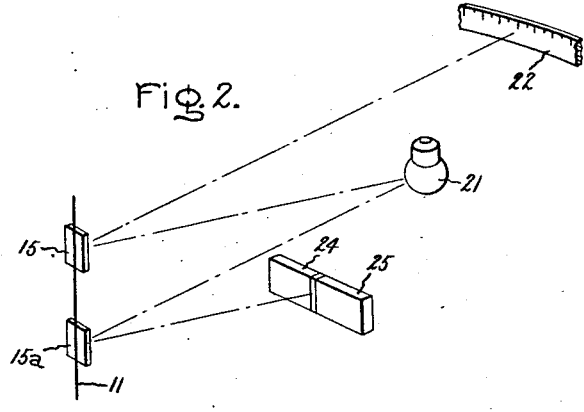

The features of my invention which are believed to be novel and patentable will be pointed out in the claims appended hereto. For a better understanding of my invention, reference is made in the following description to the accompanying drawing which illustrates a suspension galvanometer of the light-beam indicating type equipped with a divided photocell onto which a portion of the deflected light-beam is directed and which, when connected differentially and in series relation with the moving coil of the galvanometer, returns the same to a zero position. Fig. 2 represents a modification using separate galvanometer mirrors for the scale and light cells.

Figure 1:
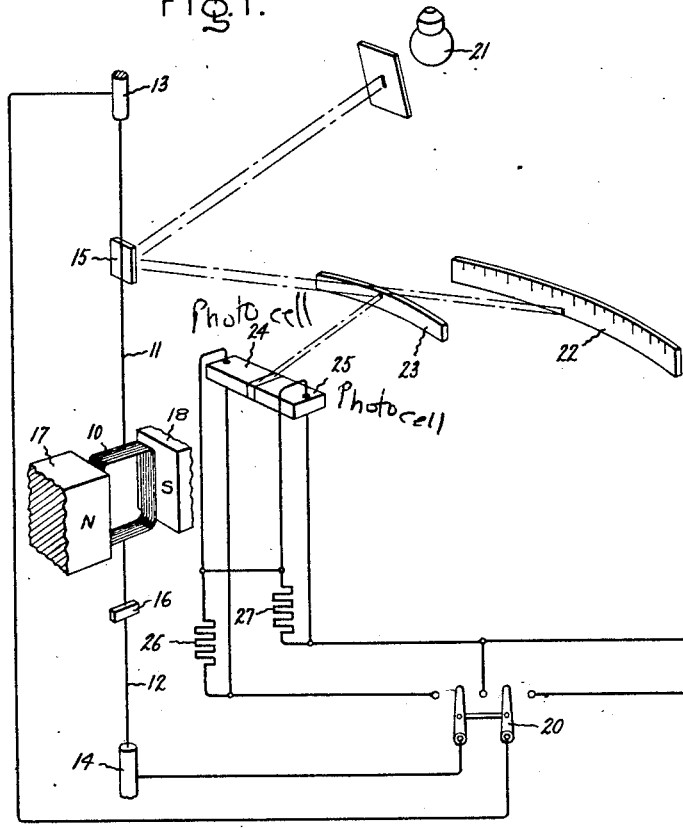

Referring to the drawing (Fig. 1) I have represented a galvanometer used as a fluxmeter. Ten (10) represents the moving coil suspended by torsion wires 11 and 12, which also serve to conduct energizing current to the moving coil 10. Thirteen (13) and 14 represent the upper and lower suspension supports. The suspension also carries a mirror 15 and a no-drift magnet 16. As described in the above-mentioned Rich application, the tiny permanent magnet 16 is polarized to oppose the leakage flux from the main stationary permanent magnet field system, the north and south poles of which are represented at 17 and 18. The suspension system is represented in its zero central position. When it is turned either way from such position in response to current flow in its moving coil, the torsion of its suspension wires is neutralized substantially over the deflection range by the torque of the permanent magnet 16 which tends to reverse its position from that shown. As a result, the moving system has negligible drift and tends to remain in any position to which deflected.

Nineteen (19) represents a flux search coil to which coil 10 may be connected by the switch 20. When so connected, any change of flux through search coil 19 will result in a deflection of the galvanometer, the extent and direction of the deflection representing a measurement of the magnitude and direction of flux change in the search coil. This measurement is indicated by a light-beam from a light source 21 reflected from the galvanometer mirror 15 onto a scale 22. A portion of the light-beam as reflected from mirror 15 to scale 22 is cut off by a mirror 23 and reflected to a divided photocell device having photocell parts 24 and 25. The light-sensitive means are suitably protected from other light. When the galvanometer is in its central zero deflection position shown, the light-beam falling on the photocell device falls upon the dividing line between the two photocells 24 and 25, as represented. When the galvanometer deflects to the right of center, the beam which is directed toward the photocell falls on photocell 25. When the galvanometer deflects to the left of center, the photocell beam is directed onto cell 24. It is understood that a portion of the beam from mirror 15 continues to scale 22 and indicates such deflections. Cell 24 is connected across a resistance 26 with its positive terminal at the top, and cell 25 is connected across a resistance 27 with its positive terminal at the top. The upper positive terminals of the resistances are connected together, and the lower terminals are connected to stationary terminals of the double-pole, double-throw switch 20, as represented.

It is now seen that when the switch 20 is closed to the left, the galvanometer coil 10 is connected in series with resistances 26 and 27, and the photocells in parallel with the two photocells connected differentially or in opposition. In the central or zero deflection position the voltages, if any, of the two photocells will be equal and opposite, and no current will flow in the circuit of coil 10. When the light falls all on photocell 24, the galvanometer will be energized in such a direction as to deflect toward zero and return the light-beam to center position. If the light falls all on cell 25, the galvanometer will be energized but in a direction reverse to that just previously mentioned, and again the galvanometer will be deflected toward zero and return the light-beam to the center position. Thus at any time switch 20 is closed to the left, the galvanometer, if not in a zero central position, will be returned to such position by current furnished by one or the other of the two photocells 24 or 25. Thus I have provided a simple but effective means for quickly returning the galvanometer to the zero central position from any other position effective upon the closing of switch 20 to the left. The resistances 26 and 27 are selected to have the proper value relative to the voltages generated by the photocells and the sensitivity of the galvanometer to accomplish the desired result quickly but without shock to the galvanometer.

The apparatus is used as follows: When a measurement is to be made, the switch 20 is closed to the right to connect the search coil to the galvanometer. Any change of flux through coil 19 will now be indicated on scale 22 which may be read with leisure. The light-beam on the photocell device will now be off-center but the zero return is not effective until switch 20 is closed to the left, which is done whenever it is desired that the galvanometer be returned to the zero center position. It is apparent that the zero return feature here described may be readily added to existing galvanometers with small expense. In Fig. 2 a separate galvanometer mirror 15a is used to reflect light directly to the photocells.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A galvanometer having a moving element suspended by a torsional suspension and arranged for deflection in opposite directions from a central zero deflecting position where the torque of the suspension is zero, means for substantially neutralizing the torque of the suspension in other deflecting positions, and means for returning the movable element to the center zero deflecting position from either direction therefrom comprising a normally open energizing circuit for said galvanometer including a pair of light-sensitive means for generating opposing voltages in said circuit, a light source, a mirror on the moving system for directing light rays from said source onto said light-sensitive means and inversely varying the distribution of light between said pair of light-sensitive means in accordance with the deflection, such light distribution being equal on the two light-sensitive means at zero deflection.

2. An electrical deflecting instrument of the direct current type having a moving element arranged to have a negligible drift over its range of deflection when the instrument is deenergized and means for returning said movable element to a predetermined position from either direction of deflection therefrom comprising a direct current circuit with means for connecting said circuit to energize said instrument at will, and means responsive to the deflecting position of the moving element of said instrument for controlling the direction and magnitude of current in said circuit so that the moving element will be automatically returned to said predetermined deflecting position when the instrument is energized from said circuit.

3. A fluxmeter comprising a galvanometer having a stationary permanent magnet field and a coil mounted for angular deflection about its axis within said field, a search coil, a pair of photocells, a mirror rotated proportional to the angular deflection of said coil, a light source, a scale onto which a beam of light is reflected from said source by said mirror to indicate the measurement deflection of said galvanometer, a reflector between the mirror and scale cutting off a portion of the light reflected from said mirror toward said scale and reflecting such portion toward said photocells such that light strikes both cells equally when the coil is at the center of its deflection range, strikes one cell only when at the extremity of its deflection range in one direction and the other cell only when at the extremity of its deflection in the opposite direction, and means for alternately connecting said moving coil to the search coil and in series relation with said photocells with the cells in opposing voltage relation.

4. An electrical measuring instrument having a moving element for producing a measurement deflection and means for causing said moving element to assume a predetermined position when not being used for measurement purposes comprising an auxiliary energizing circuit for said instrument, means for connecting and disconnecting said circuit to said instrument, and photoelectric current control means in said circuit directly responsive to the deflection of said instrument from such predetermined position for determining the direction and magnitude of the current in said auxiliary energizing circuit when connected to energize said instrument.

GEORGE F. GARDNER.